US010998651B2

(12) United States Patent
Moshggoo et al.

(10) Patent No.: US 10,998,651 B2
(45) Date of Patent: May 4, 2021

(54) FLAME-RESISTANT HEAT SHRINK ASSEMBLIES FOR TRACE HEATING CABLES

(71) Applicant: nVent Services GmbH, Schaffhausen (CH)

(72) Inventors: Shadi Moshggoo, San Jose, CA (US); Sirarpi Bicakci Jenkins, Menlo Park, CA (US); Wesley Dong, Belmont, CA (US)

(73) Assignee: nVent Services GmbH, Schaffhausen (CH)

( * ) Notice: Subject to any disclaimer, the term of this patent is extended or adjusted under 35 U.S.C. 154(b) by 0 days.

(21) Appl. No.: 16/881,067

(22) Filed: May 22, 2020

(65) Prior Publication Data

US 2020/0373688 A1 Nov. 26, 2020

Related U.S. Application Data

(60) Provisional application No. 62/851,275, filed on May 22, 2019.

(51) Int. Cl.
*H01R 4/70* (2006.01)
*H01R 4/72* (2006.01)
*H01R 4/22* (2006.01)
*H02G 15/18* (2006.01)

(52) U.S. Cl.
CPC .............. *H01R 4/726* (2013.01); *H01R 4/22* (2013.01); *H02G 15/1806* (2013.01)

(58) Field of Classification Search
CPC ........ H02G 15/02; H02G 15/04; H02G 15/06; H01R 4/22; H01R 4/70; H01R 4/72

USPC .......... 174/74 R, 74 A, 77 R, 75 F, 83, 84 R, 174/88 R
See application file for complete search history.

(56) References Cited

U.S. PATENT DOCUMENTS

| 3,341,690 | A | * | 9/1967 | Commins | ................ H05B 3/56 219/528 |
|---|---|---|---|---|---|
| 4,287,012 | A | | 9/1981 | Midgley et al. | |
| 4,296,986 | A | | 10/1981 | Herrmann, Jr. | |
| 4,419,304 | A | * | 12/1983 | Ficke | ...................... B29C 35/08 264/230 |
| 4,467,137 | A | | 8/1984 | Jonathan et al. | |
| 4,569,868 | A | | 2/1986 | DeBlauwe et al. | |
| 4,648,924 | A | | 3/1987 | Nolf | |
| 4,734,543 | A | | 3/1988 | Nolf | |

(Continued)

FOREIGN PATENT DOCUMENTS

| CA | 1057373 A | 6/1979 |
|---|---|---|
| CA | 2615435 A1 | 1/2007 |

(Continued)

OTHER PUBLICATIONS

3M Cold Shrink Branch Cable Splice QS2001B, select pages from product catalog, undated, 66 pages.

(Continued)

*Primary Examiner* — William H. Mayo, III
(74) *Attorney, Agent, or Firm* — Quarles & Brady LLP

(57) ABSTRACT

An end cap for a heat shrink kit having a heat shrink tubing, wherein the end cap includes a tubing portion sized to be inserted into the heat shrink tubing and an end portion configured to prevent at least a portion of a flame from reaching the heat shrink tubing.

19 Claims, 11 Drawing Sheets

(56) References Cited

U.S. PATENT DOCUMENTS

| | | | |
|---|---|---|---|
| 4,766,267 A | 8/1988 | Gray et al. | |
| 4,797,509 A | 1/1989 | Cook | |
| 4,924,034 A | 5/1990 | Truesdale et al. | |
| 4,961,978 A | 10/1990 | Doheny, Jr. et al. | |
| 5,022,941 A | 6/1991 | Doheny, Jr. et al. | |
| 5,158,815 A | 10/1992 | Doheny, Jr. et al. | |
| 5,346,539 A | 9/1994 | Hosoi et al. | |
| 5,399,808 A | 3/1995 | Carter et al. | |
| 5,415,713 A | 5/1995 | Vatcher | |
| 5,439,031 A * | 8/1995 | Steele | F16L 55/1116 138/178 |
| 5,698,280 A | 12/1997 | Affolderbach et al. | |
| 5,998,772 A * | 12/1999 | Kirma | B64D 15/12 219/517 |
| 6,126,483 A * | 10/2000 | Kirma | B64D 15/12 219/541 |
| 6,359,226 B1 * | 3/2002 | Biddell | H01R 4/22 174/74 A |
| 6,423,952 B1 * | 7/2002 | Meisiek | H05B 3/06 219/541 |
| 6,573,484 B1 * | 6/2003 | Yue | H01R 4/26 219/541 |
| 6,839,494 B2 | 1/2005 | Clatanoff et al. | |
| 6,860,756 B2 | 3/2005 | Chen | |
| 6,969,804 B2 | 11/2005 | Payne | |
| 7,339,115 B2 | 3/2008 | Konnik | |
| 7,540,776 B2 | 6/2009 | Graeve et al. | |
| RE41,593 E | 8/2010 | Ryeczek | |
| 7,834,268 B2 | 11/2010 | Ootsuki | |
| 7,850,806 B2 | 12/2010 | Kawakita et al. | |
| 7,863,521 B2 * | 1/2011 | Campbell | H02G 15/1826 174/93 |
| 8,030,570 B2 | 10/2011 | Seraj et al. | |
| 8,178,782 B2 | 5/2012 | Kamel et al. | |
| 8,324,502 B2 | 12/2012 | Kameda et al. | |
| 8,445,783 B2 | 5/2013 | Taylor et al. | |
| 8,604,342 B2 * | 12/2013 | Solon | H02S 40/36 174/72 A |
| 8,981,224 B2 | 3/2015 | Kehl et al. | |
| 9,504,195 B2 | 11/2016 | Dinu et al. | |
| 9,779,857 B2 | 10/2017 | Seraji | |
| 9,780,549 B2 | 10/2017 | Yaworski et al. | |
| 9,985,425 B2 | 5/2018 | Yamasaki et al. | |
| 10,297,946 B1 | 5/2019 | Daga et al. | |
| 2003/0131940 A1 | 7/2003 | Saito | |
| 2004/0028862 A1 | 2/2004 | Burwell et al. | |
| 2009/0283294 A1 | 11/2009 | Bukovnik | |
| 2011/0011484 A1 | 1/2011 | Evoniuk et al. | |
| 2016/0013604 A1 | 1/2016 | Newbauer, III | |
| 2017/0271861 A1 | 9/2017 | Ruess et al. | |
| 2018/0109099 A1 | 4/2018 | Fukumoto et al. | |
| 2018/0241190 A1 | 8/2018 | Gyppaz et al. | |

FOREIGN PATENT DOCUMENTS

| | | |
|---|---|---|
| CN | 202918109 U | 5/2013 |
| CN | 203433865 U | 2/2014 |
| CN | 104079110 A | 10/2014 |
| CN | 109510000 A | 3/2019 |
| DE | 4028769 A1 | 3/1992 |
| EP | 0235833 A1 | 9/1987 |
| EP | 0094848 B1 | 8/1988 |
| EP | 0111553 B1 | 5/1989 |
| EP | 2784559 B1 | 1/2016 |
| GB | 1599914 A | 10/1981 |
| WO | 2008099675 A1 | 8/2008 |
| WO | 2014189567 A2 | 10/2014 |
| WO | 2018147026 A1 | 8/2018 |
| WO | 2018168409 A1 | 9/2018 |

OTHER PUBLICATIONS

3M QS200 22kV Cold-Shrink Inline Joint with Cold-Shrink re-jacketing, including connectors datasheet, copyright 3M2010, Sep. 2010, Issue 1, 2 pages.

Shenzhen Sunbow Insulation Material MFG. Co., Ltd., Flame Resistance Polyolefin Heat Shrink End Caps for Cable product description, undated, 8 pages.

DSG-Canusa, Heat Shrink Technology, product selection chart, undated, 62 pages.

* cited by examiner

FLAME-RESISTANT HEAT SHRINK ASSEMBLIES FOR TRACE HEATING CABLES

RELATED APPLICATIONS

This application is a non-provisional of, and claims the benefit of priority from, U.S. Prov. Pat. App. Ser. No. 62/851,275, filed under the same title on May 22, 2019, and incorporated fully herein by reference.

BACKGROUND

During construction or repair of electrical systems, it may be necessary to join two or more cables together, or to properly terminate a single cable. Heat shrink kits that utilize heat shrink tubing can be used to join the two cables together or terminate the single cable. Heat shrink kits can include splice connection kits, tee splice kits, cold-lead kits, and/or end seal kits. Splice connection kits (which can also be referred to as splice kits) can include any components used to properly connect two ends of electric heat trace cables together. Splice kits can utilize soldering, welding, twisting, and/or mechanical connectors to connect two identical cables. Tee splice kits (which may also be referred to as tee connection kits) can include any components such as mechanical connectors used to properly connect three ends of electric heat trace cables together. Cold-lead kits can include electrically-insulated wiring that connects heating conductors to branch circuit wiring, and can be designed to not produce appreciable heat. End seal kits seal off the end of a single cable, and can include any components used to properly terminate the end of an electric heat trace cable that is not wired to power. There may be exposed wires or mechanical connectors in between insulated sections of the cable(s). The exposed section can be covered with heat shrink tubing, which can provide a barrier against moisture as well as electrical insulation.

Heat shrink tubing can include an adhesive lining. Adhesive lined heat shrink tubing is ubiquitous, and is an effective moisture sealer and electrical insulator. However, being polymeric in construction, the heat shrink tubing's resistance to flammability is limited, even when the tubing contains flame retardants. In many applications, resistance to flammability is of great concern. For example, certain heat shrink kits may be required to pass flammability tests such as CSA standard C22.2 No. 130-16.

Certain splice kits or cold-lead kits may be used to provide flammability protection to a tee connection (i.e. where three heating cable are joined together), while end seal kits can be used to provide flammability protection to an end of a cable (i.e. the end of a single heating cable). Kits used to protect tee connections or an end of a cable may have a sealed or pinched portion at the end of the heat shrink tubing, where the tubing is crimped during installation, before or after heat is applied to shrink the tubing. The pinched portion has been shown to be less resistant to flame than other parts of the heat shrink kit, in certain flammability tests. For example, CSA standard C22.2 No. 130-16 allows a flame to be provided anywhere along the heat shrink kit, including at the sealed or pinched portion at the tee connection or the end of the cable; if the flame applied to the pinched portion causes the sealed area to open up, the adhesive may ignite and burn for longer than the allowed duration per the test standard.

SUMMARY

The invention addresses the need for a cost effective and easy-to-use method to improve flammability protection for tee connection kits, splice kits with vertically aligned heating cables, and end seal heat shrink kits and overcome the drawbacks listed above. According to an aspect of the disclosure, a splice kit for providing environmental protection to a splice of electric heating cables includes: a length of heat shrink tubing having a pre-shrunk inner diameter and a shrunk inner diameter; and, an end cap made of a flame-resistant material. The end cap includes: a tubing portion having an inner surface, an outer surface, and one or more projections extending outward from the outer surface, the tubing portion sized to fit within the pre-shrunk inner diameter and to be larger than the shrunk inner diameter; an end portion integral with the tubing portion and wider than the tubing portion, the end portion configured to prevent at least a portion of a flame from reaching the heat shrink tubing; and, an interior space defined by the inner surface of the tubing portion, the interior space being configured to receive conductors of the heating cables that are connected together at the splice.

In one aspect, the end cap can be cylindrical, and the one or more projections can include a first rib extending entirely around a circumference of the outer surface. The tubing portion can have an outer diameter measured at the outer surface, and the end portion has an outer diameter that is greater than the outer diameter of the tubing portion. In another aspect, the tubing portion and the end portion can be prismatic. The tubing portion can include grooves formed into the outer surface to define the one or more projections. The projections can be formed at each of a plurality of corners of the tubing portion. The end portion can include a front surface and a rear surface opposite the front surface, the rear surface cooperating with the inner surface of the tubing portion to define the interior space. The interior space of the end cap can have a tapering width; the tapering width can include a maximum width at a distal end of the tubing portion opposite the end portion, and a minimum width approximate the end portion. The heat shrink tubing can be selected relative to a size of the end cap to allow the splice protected by the splice kit to pass a vertical flame flammability test. The splice kit can further include a first mastic layer configured to be applied over an interface between the end cap and the heating cables before the heat shrink tubing is placed over the splice and then shrunk.

According to other aspects of the disclosure, an end cap for a heat shrink kit having a heat shrink tubing is provided. The heat shrink kit can be a tee connection kit, an end seal kit, or another splice kit. The end cap includes a tubing portion sized to be inserted into the heat shrink tubing and an end portion configured to prevent at least a portion of a flame from reaching the heat shrink tubing.

According to another aspect of the disclosure, an end cap for a heat shrink kit having a heat shrink tubing is provided. The end cap includes a tubing portion sized to be inserted into the heat shrink tubing. The end cap is configured to allow the heat shrink kit to pass a vertical flame flammability test.

According to yet another aspect of the disclosure, an end cap for a heat shrink kit having a heat shrink tubing is provided. The end cap includes a tubing portion sized to be inserted into the heat shrink tubing and having a first diameter and an end portion having a second diameter, the second diameter being larger than the first diameter.

DESCRIPTION OF THE DRAWINGS

The present disclosure will hereafter be described with reference to the accompanying drawings, wherein like reference numerals denote like elements.

DETAILED DESCRIPTION

Figure 1A:
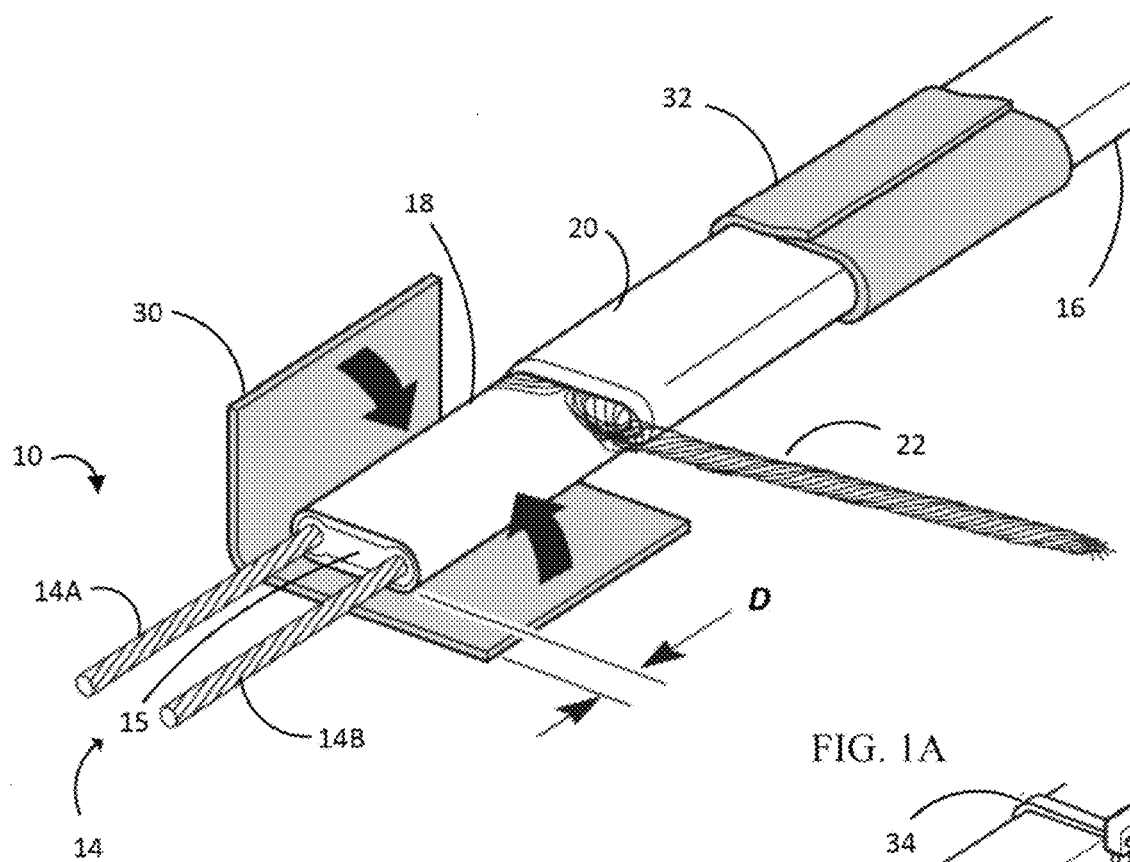
FIGS. 1A-D illustrate a perspective view of several steps of creating a tee connection splice of three heating cables, using an example splice kit in accordance with the disclosure.

Before the present invention is described in further detail, it is to be understood that the invention is not limited to the particular aspects described. It is also to be understood that the terminology used herein is for the purpose of describing particular aspects only, and is not intended to be limiting. The scope of the present invention will be limited only by the claims. As used herein, the singular forms "a", "an", and "the" include plural aspects unless the context clearly dictates otherwise.

It should be apparent to those skilled in the art that many additional modifications beside those already described are possible without departing from the inventive concepts. In interpreting this disclosure, all terms should be interpreted in the broadest possible manner consistent with the context. Variations of the term "comprising", "including", or "having" should be interpreted as referring to elements, components, or steps in a non-exclusive manner, so the referenced elements, components, or steps may be combined with other elements, components, or steps that are not expressly referenced. Aspects referenced as "comprising", "including", or "having" certain elements are also contemplated as "consisting essentially of" and "consisting of" those elements, unless the context clearly dictates otherwise. It should be appreciated that aspects of the disclosure that are described with respect to a system are applicable to the methods, and vice versa, unless the context explicitly dictates otherwise.

Numeric ranges disclosed herein are inclusive of their endpoints. For example, a numeric range of between 1 and 10 includes the values 1 and 10. When a series of numeric ranges are disclosed for a given value, the present disclosure expressly contemplates ranges including all combinations of the upper and lower bounds of those ranges. For example, a numeric range of between 1 and 10 or between 2 and 9 is intended to include the numeric ranges of between 1 and 9 and between 2 and 10.

Existing approaches to splicing or terminating an electric trace heating cable include covering the splice or cable end with heat shrink tubing to protect it from the environment. The heat shrink tubing of a splice kit can be a single- or dual-layer heat shrink tubing and typically has an adhesive layer on its inner surface. The heat shrink tubing can be made from polyolefin, a fluoropolymer such as FEP, PTFE or Kynar, PVC, neoprene, silicone elastomer, Viton, or any other appropriate material that can shrink after heat is applied in order to provide a moisture barrier and/or electrical insulation. A splice kit for a cable splice can include solder and/or mechanical connectors [MA1] that connect two or more cables together. A splice kit for a cold-lead splice can include a mechanical connector and/or other appropriate components to join two lengths of cable together without the use of heat.

During installation of existing heat shrink kits, the heat shrink tubing is crimped or pinched to form a seal over the splice or at the end of the cable(s). This can form a pinched portion in which the adhesive may only be in contact with other adhesive, or with the heat shrink tubing, or with a component to which the adhesive does not well adhere. The pinched portion can be created by positioning a portion of the heat shrink tubing away from components of the cable and/or other components of the heat shrink kit, and crimping the portion with a tool such as needle nose pliers. The adhesive layer of the heat shrink tubing may keep the pinched portion in place and prevent the pinched portion from becoming uncrimped during service. The heat shrink tubing can then be shrunk. Alternatively, the pinched portion can be created by crimping the heat shrink tubing after heat has been applied to shrink the heat shrink tubing by pinching it with a tool such as a needle nose plier.

Crimping the heat shrink tubing to create the pinched portion can electrically insulate the cable as well as provide protection from moisture, but the pinched portion becomes a focal point of the overall flammability protection afforded by the heat shrink kit. The present disclosure provides apparatuses and installation methods for a heat shrink kit including a splice kit and a heat shrink assembly that overcomes the drawbacks of existing heat shrink kits by eliminating the pinched portion that remains after installation.

FIGS. 1A-D illustrate steps of using an example splice kit in accordance with this disclosure. The splice kit can include a tee connection kit 10 for electrically connecting the conductors 14 of multiple cables 16. In these Figures, the tee connection kit 10 is shown without a heat shrink assembly of the splice kit, which fits over and obscures the tee connection kit 10. In some embodiments, including the illustrated example, the cables 16 can be self-regulating heating cables each including two conductors 14A, 14B and a core 15 of positive temperature coefficient (PTC) material that form a resistive heating circuit; a corresponding mechanical connector 12 mechanically and electrically couples together the conductors 14 of each cable 16 that are carrying the electric current in the same direction. In addition to the conductors 14, the cables 16 may include a layer of insulation 18, and a jacket 20, and in some embodiments a braided layer 22 having one or more braided wires for grounding the cable 16.

Each cable 16 can be prepared for splicing by exposing a suitable length of the conductors 14. For example, as shown in FIG. 1A the jacket 20 can be stripped back, and the braided wires of the braided layer 22 twisted into one or more bundles that can be easily moved aside; then, a portion of exposed insulation 18 can be stripped from the core 15, which in turn can be cut or stripped away from the conductors 14A,B. One or more adhesive layers, such as mastic strips 30, 32, can be applied to parts of the cable 16. For example, a first mastic strip 30 can be adhered to the remaining exposed insulation 18, and a second mastic strip 32 can be adhered to the jacket 20. The adhesive layers later adhere to the unshrunk heat shrink tubing, to hold the latter in place; the adhesive layers can also adhere to other cables 16, and/or to other adhesive layers of cables 16 being spliced together. Adhesive layers such as mastic can also be flame-retardant, increasing the flame resistance of the completed splice. Finally, a mastic strip 30 or other adhesive layer can extend a length D beyond the end of the exposed insulation 18 and core 16; after the mastic strip 30 is wrapped around the cable 16, the excess extending beyond the end of the cable can be pinched together between and around the conductors 14A, B to seal the core 15 from liquid ingress.

Figure 1B:
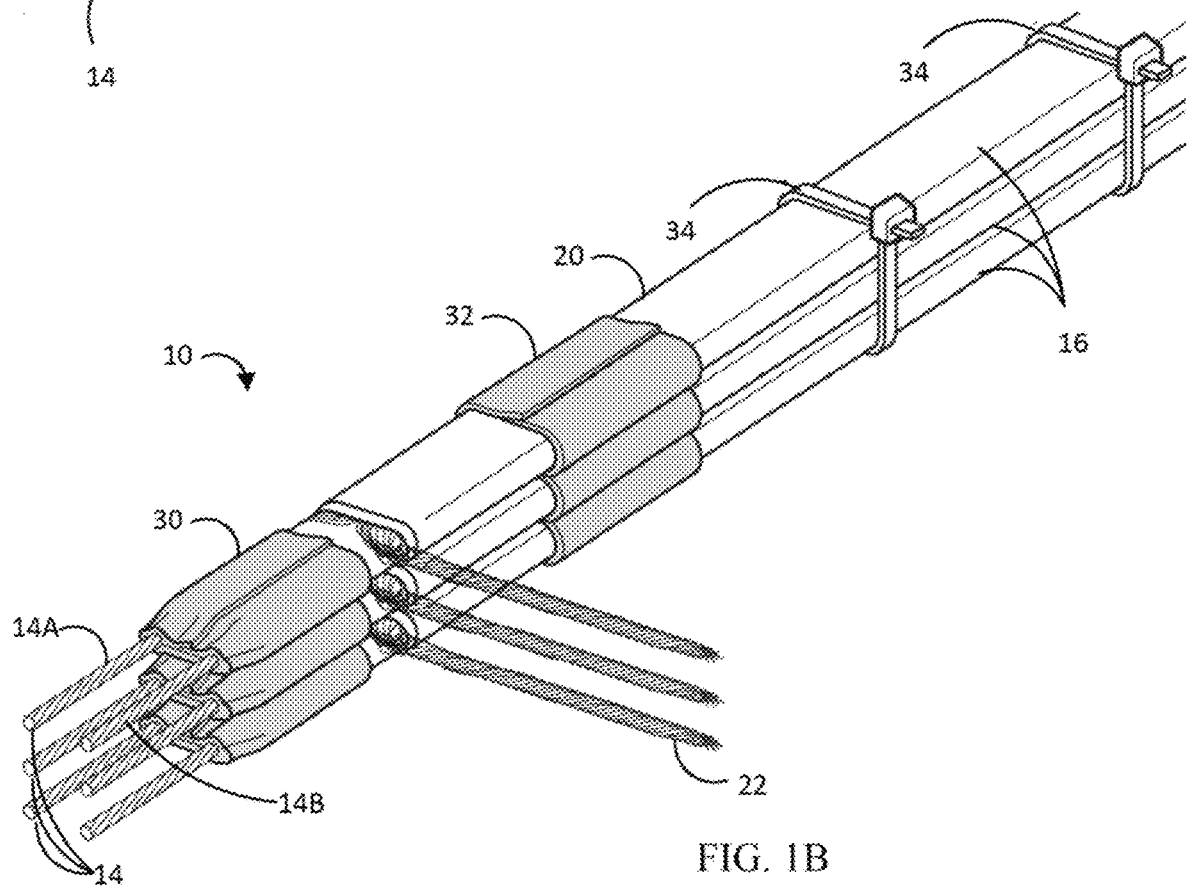
Figure 1C:
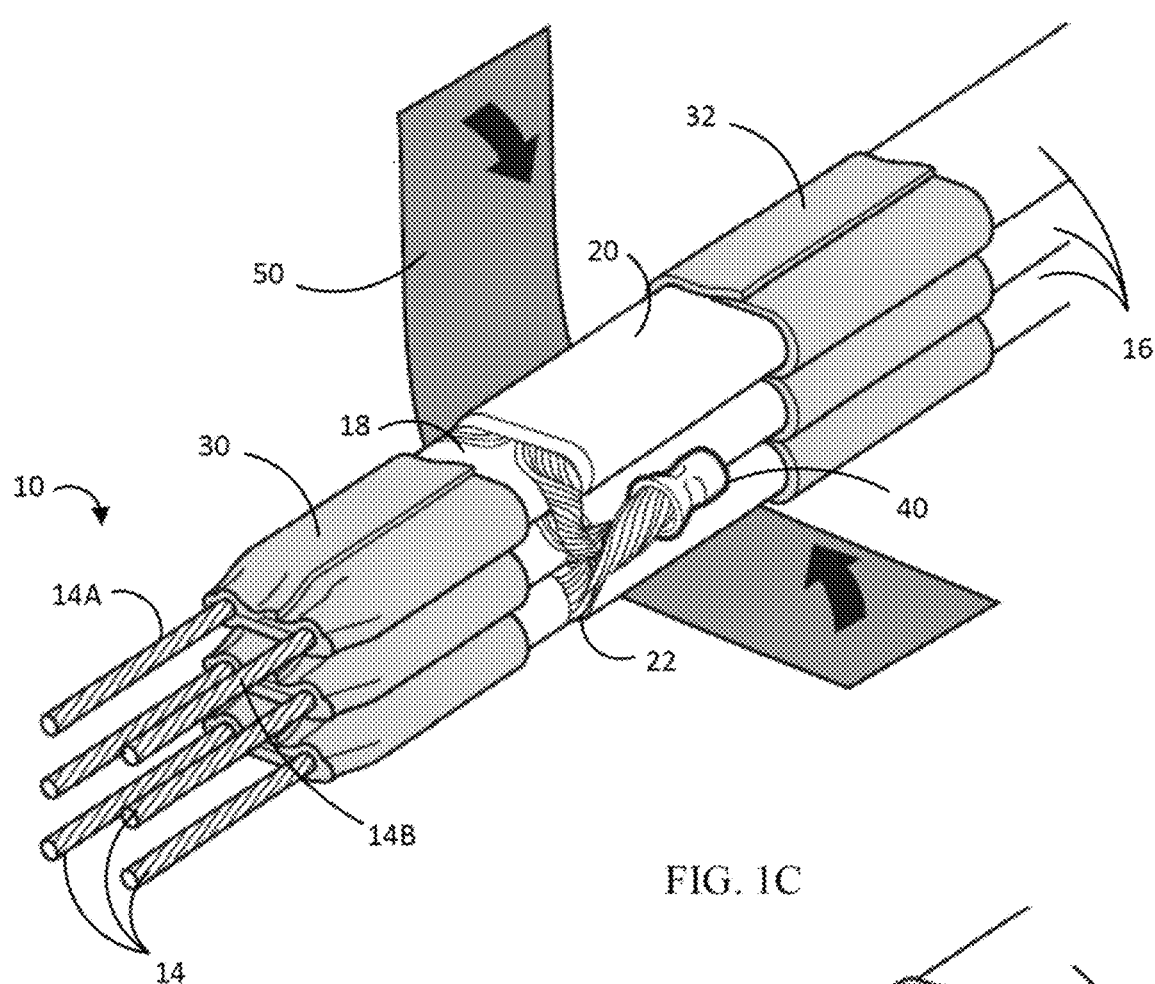

As shown in FIG. 1B, for a three-cable tee splice, the cables 16 can be aligned and then coupled together. For example, the adhesive layers can be used to align and then adhere the cables 16 to each other, so the corresponding conductors can be twisted together. In some embodiments, one or more zip-ties 34 or other fasteners can be used to couple together the cables 16. Referring to FIG. 1C, the braided layers 22 of the cables 16 can be coupled together and then secured to the bundle of cables. For example, the twisted bundles of braided wires can be twisted together and secured by an insulating end cap 40, which in turn can be secured against the jackets 20 with fabric tape 50.

Figure 1D:
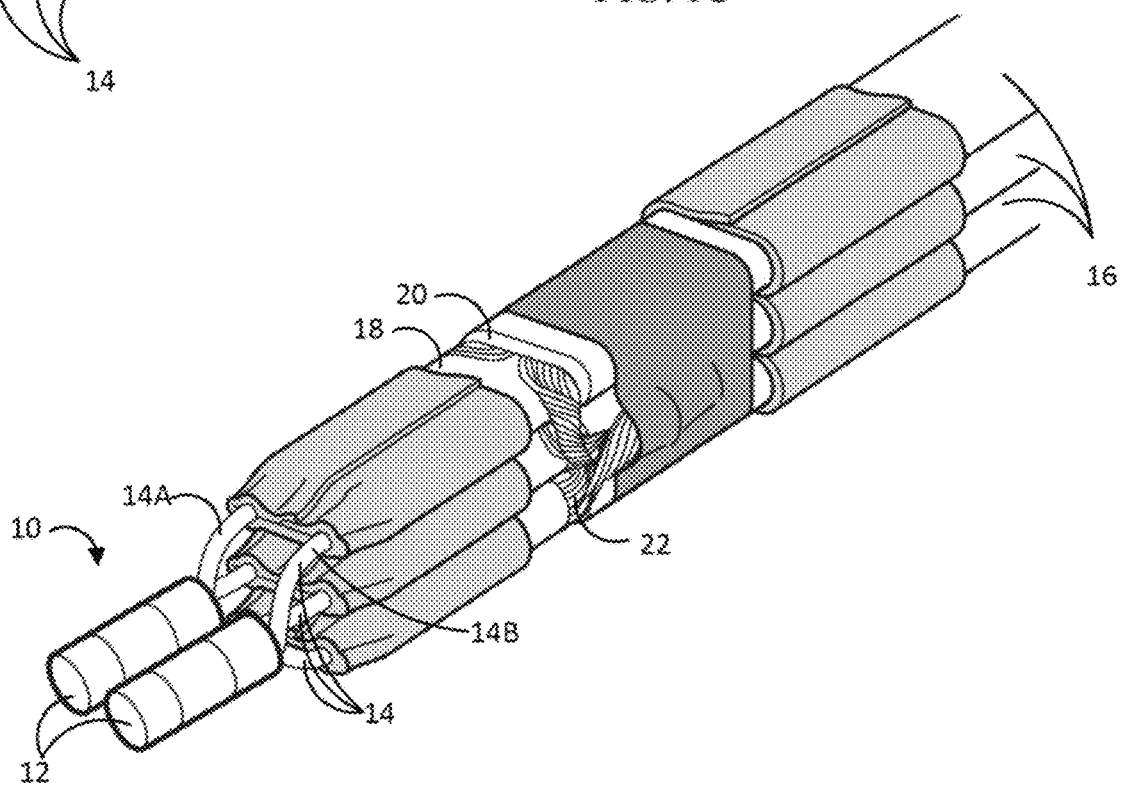

Referring to FIG. 1D, the tee connection kit 10 can include one or more mechanical connectors 12, which can be coupled to one or more conductors 14 of each of the cables 16. The mechanical connectors 12 may be a push in wire fitting, crimp cap, or any other mechanical connector to join two or more lengths of wire or cable together without the use of heat. As illustrated, the corresponding conductor of each of the cables can be twisted together, and then secured using one of the mechanical connectors 12. In an alternate embodiment of splice-type tee connection kits, corresponding conductors 14 of each of the cables 16 may be soldered together and the mechanical connectors 12 may be omitted. Heat shrink tubing can be placed around the cables 16 and connectors and shrunk using a heat applicator such as a heat gun or a torch, as described further below. The heat shrink tubing may provide electrical insulation as well as flammability protection.

Figure 2A:
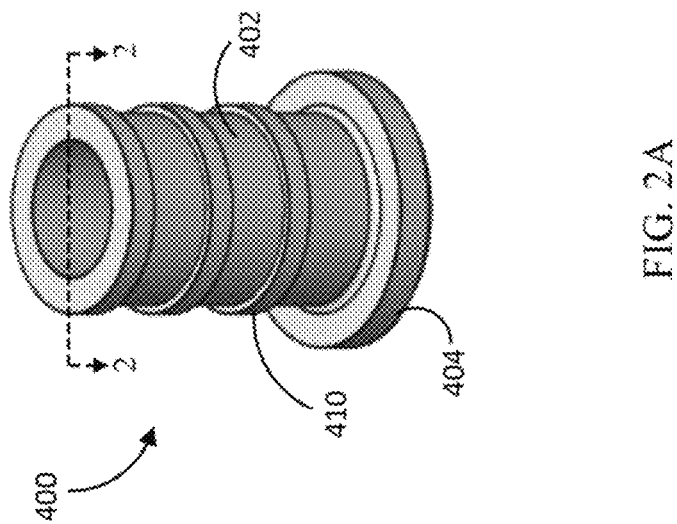
FIG. 2A is a perspective view of an example end cap according to the disclosure.
Figure 2B:
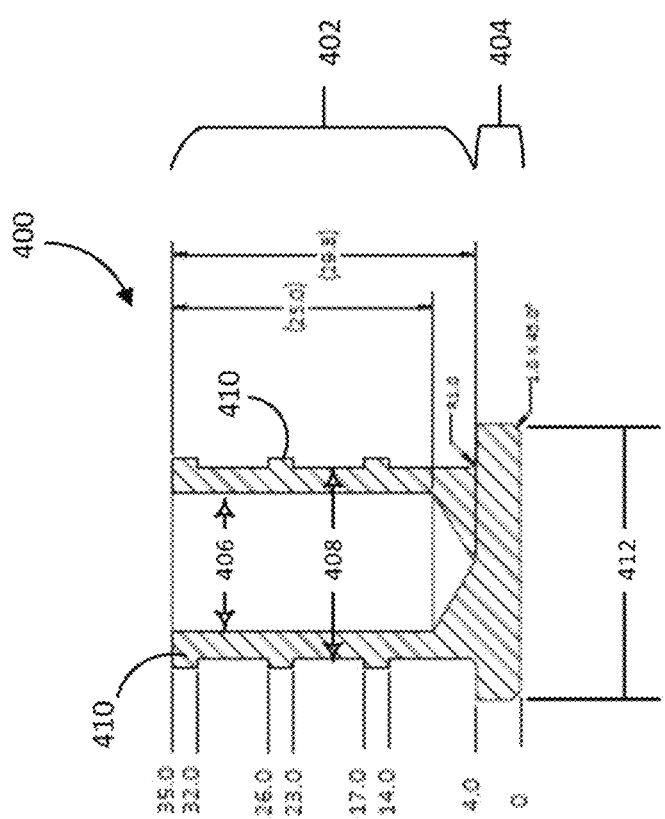
FIG. 2B is a cross-sectional side view of the example end cap taken along line 2-2 of FIG. 2A.

Referring now to FIGS. 2A and 2B, a perspective view and a cross-sectional view are shown of an example embodiment of an end cap 400. The end cap 400 can be made from a flame retardant material such as unfilled or glass filled polyphenylene sulfide (PPS) or polyetherimide (PEI) as described above. The end cap 400 may have a tubing portion 402 and an end portion 404. The tubing portion may be inserted into a heat shrink tubing. At least a portion of the tubing portion 402 may be in contact with an inner surface of the heat shrink tubing. The end portion 404 may prevent a flame applied during a flammability test from reaching an adhesive of the heat shrink tubing and thereby provide flammability protection for the heat shrink tubing, as will be explained in detail below.

Figure 3:
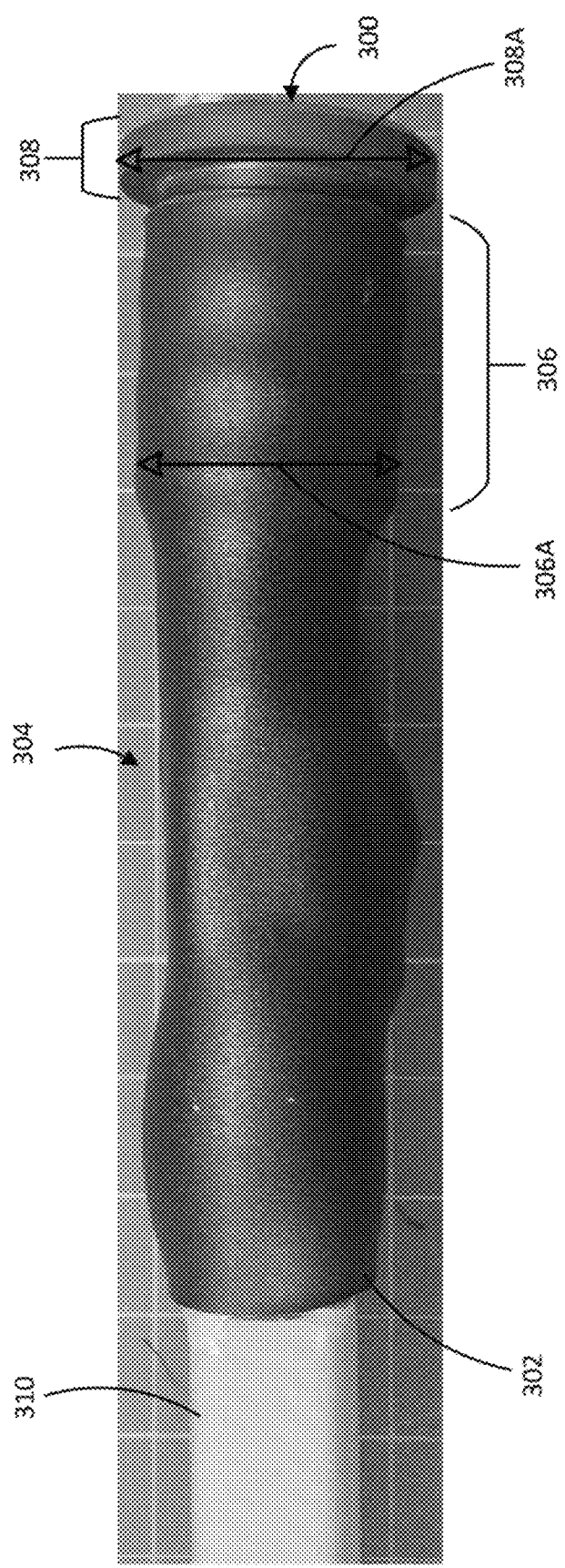
FIG. 3 is a top view of an example flame-resistant heat shrink assembly installed over a spliced heating cable, in accordance with the disclosure.

The tubing portion 402 can be sized to fit inside heat shrink tubing as shown in FIG. 3. Specifically, an outer diameter 408 can be sized to allow tubing portion 402 to fit inside the heat shrink tubing; further, an inner diameter 406 can be sized to allow one or more components of a cable and/or heat shrink kit to fit inside the tubing portion 402. In accordance with some embodiments, the heat shrink tubing should be chosen based on an appropriate minimum expanded inside diameter and a maximum recovered (i.e. shrunk) inside diameter after a shrinking process. An appropriate heat shrink tubing can be chosen by selecting a heat shrink tubing which fits a kit dimension (i.e. fits around and/or over a heat shrink kit) before a shrinking process and nearly fully recovers after the shrinking process. If a heat shrink tubing does not nearly fully recover, it may shrink further and potentially split during the flammability testing. To reduce likelihood of splitting during the test, the maximum recovered inside diameter of the heat shrink tubing can be selected to be approximately equal to or slightly smaller than the outer diameter or equivalent outer diameter (i.e perimeter divided by pi). For example, a heat shrink tubing with a high shrink ratio and a recovered inner diameter significantly smaller than the outer diameter 408 may burst during flammability testing as the heat shrink tubing may further contract around the end cap 400 and potentially rupture.

The tubing portion 402 may include one or more ribs 410 extending laterally outward from the outer surface and thus being wider than the outer diameter 408 of the tubing portion 402. If the outer diameter 408 is smaller than the minimum expanded (i.e. unshrunk) inner diameter of the heat shrink tubing, the heat shrink tubing can be easily slid over the end cap and the ribs 410 may allow the end cap 400 be retained more tightly by friction fit than an end cap without ribs 410. When the heat shrink tubing is shrunk, the ribs 410 may also allow the heat shrink tubing to be better coupled to the end cap 400. The ribs 410 can prevent the end cap 400 from being moved along the length of the shrunk heat shrink tubing. Additionally, the ribs 410 may allow a heat shrink tubing without an adhesive lining to be used in the heat shrink kit by providing a friction fit with the heat shrink tubing and thus retaining the heat shrink tubing.

The end portion 404 may have an end cap diameter 412 that can be larger than the outer diameter 408. Furthermore, the end cap diameter 412 may be larger than the diameter of the heat shrink tubing after the heat shrink tubing is stretched and/or shrunk over the tubing portion. When the end cap diameter 412 is larger than the diameter of the stretched and/or shrunk heat shrink tubing, the end cap 400 can prevent at least a portion of a flame applied during a vertical flame test from reaching an adhesive of the heat shrink tubing, prevent at least a portion of the adhesive from igniting, and allow the heat shrink kit to pass the flammability test.

Referring now to FIG. 3, an example embodiment of an end cap 300, such as the end cap 400 illustrated in FIGS. 2A-B, is shown. The end cap 300 is inserted into a heat shrink tubing 302 of a heat shrink kit 304 for cables 310 of a tee connection. As shown, the heat shrink kit 304 is for a tee connection, although it is understood the end cap 300 may be used with a splice kit for two cables or an end seal heat shrink kit. If the end cap 300 is used with a splice kit for two cables, the two cables may be arranged on top of each other and/or vertically aligned, similar to the arrangement shown in FIG. 1 without a third cable. The heat shrink tubing 302 has been shrunk using a heat applicator. The end cap 300 can be made from a flame retardant plastic material such as unfilled or glass filled polyphenylene sulfide (PPS) or polyetherimide (PEI). The material of the end cap 300 can be chosen to be a similar color as the heat shrink tubing, which can improve the aesthetics of the heat shrink kit 304.

The end cap 300 may be inserted into the heat shrink tubing 302 in order to provide flammability protection for the heat shrink kit 304. In some embodiments, the end cap 300 can include a tubing portion 306 that fits within the heat shrink tubing 302, and an end portion 308 that is attached to or integral with the tubing portion 306 and that does not fit within the heat shrink tubing 302. The end cap 300 may only be inserted far enough into the heat shrink tubing 302 so that at least a portion of a tubing portion 306 is in direct contact with the heat shrink tubing 302, but an end portion 308 is not in direct contact with the heat shrink tubing 302. When the heat shrink tubing 302 is not in direct contact with the end portion 308, the end cap 300 may protect an adhesive of the heat shrink tubing 302 from direct impingement with a flame applied during a vertical flame test. Additionally, the end portion 308 may have an outer diameter 308A that exceeds the outer diameter 306A of the heat shrink tubing 302 when the heat shrink tubing 302 is stretched over the tubing portion 306. In this arrangement the end portion 308 may at least partially protect the heat shrink tubing 302 from encroaching flame, by preventing at least a portion of the flame from reaching the adhesive and/or heat shrink tubing 302. The end cap 300 can also provide an insulation barrier to prevent at least a portion of the heat from the flame from being conducted to the heat shrink tubing 302 and/or the adhesive.

The end cap 300 can simplify the installation of the heat shrink kit 304. The end cap 300 can prevent the need to seal the heat shrink tubing by crimping the heat shrink tubing. A user may only need to insert the end cap into the heat shrink tubing 302 and apply heat to the heat shrink tubing 302. The end cap 300 may be installed by an unskilled worker. The end cap 300 can also reduce the required size of the heat shrink tubing 302 as compared to prior heat shrink kits. Prior kits require heat shrink tubing long enough to cover one or more cables and any connection components (i.e. mechanical connectors) as well as enough excess length to allow a worker to crimp the heat shrink tubing and create a sealed area. Heat shrink kits with an end cap may only need heat shrink tubing long enough to cover the cables and any connections (e.g. soldering points, mechanical connectors, etc.) of the heat shrink kit because the end cap can eliminate the need for crimping and/or sealing the heat shrink tubing.

Figure 4:
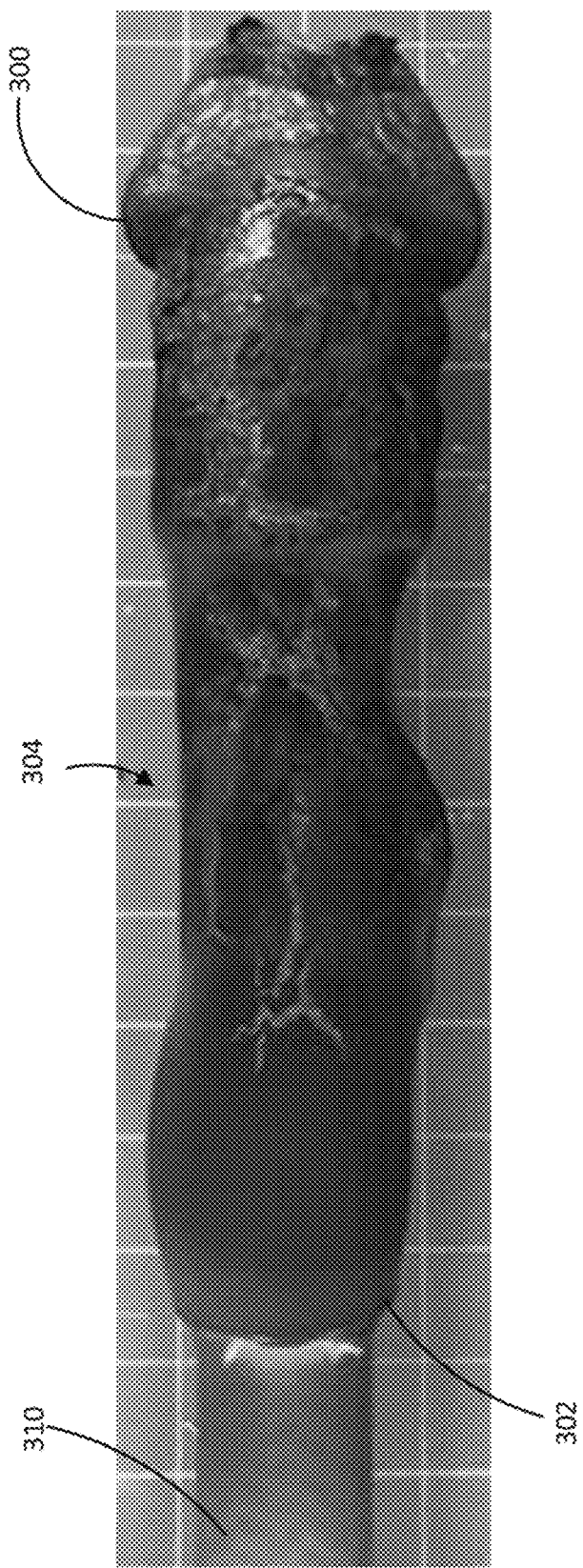
FIG. 4 is a top view of the heat shrink assembly installation of FIG. 3 after exposure to flame.
Figure 5:
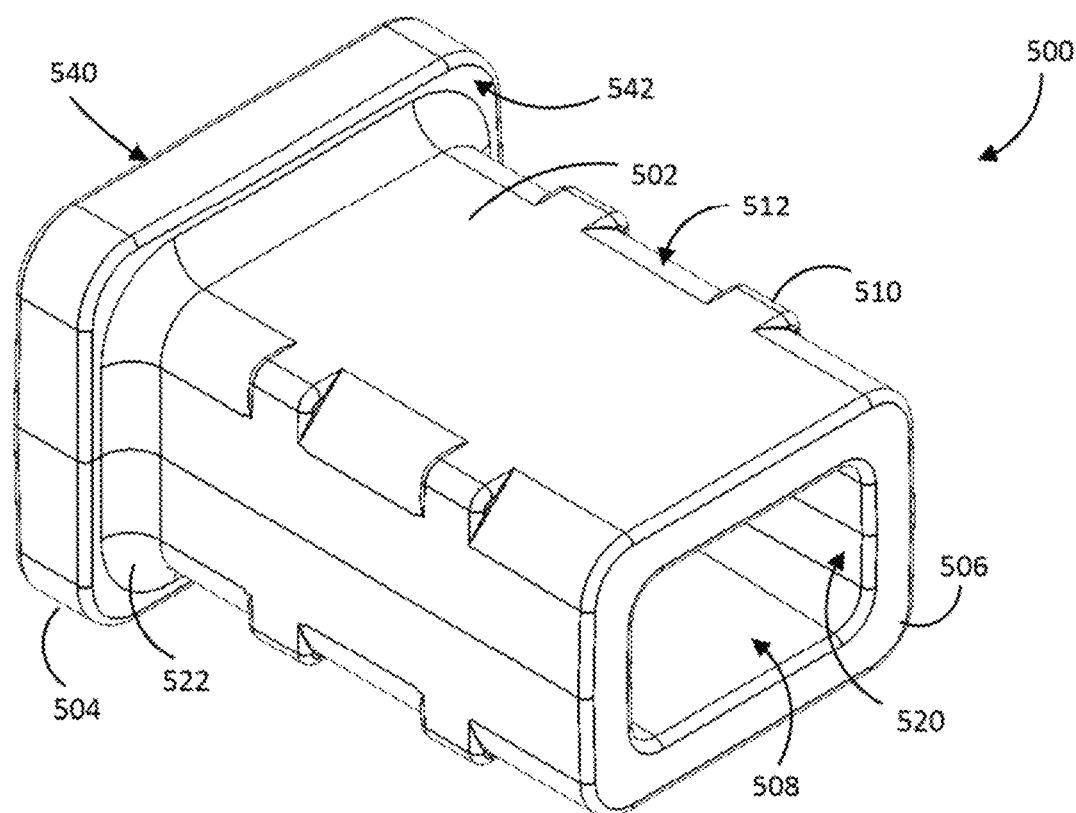
FIG. 5 is a top rear perspective view of another example end cap according to the disclosure.
Figure 6:
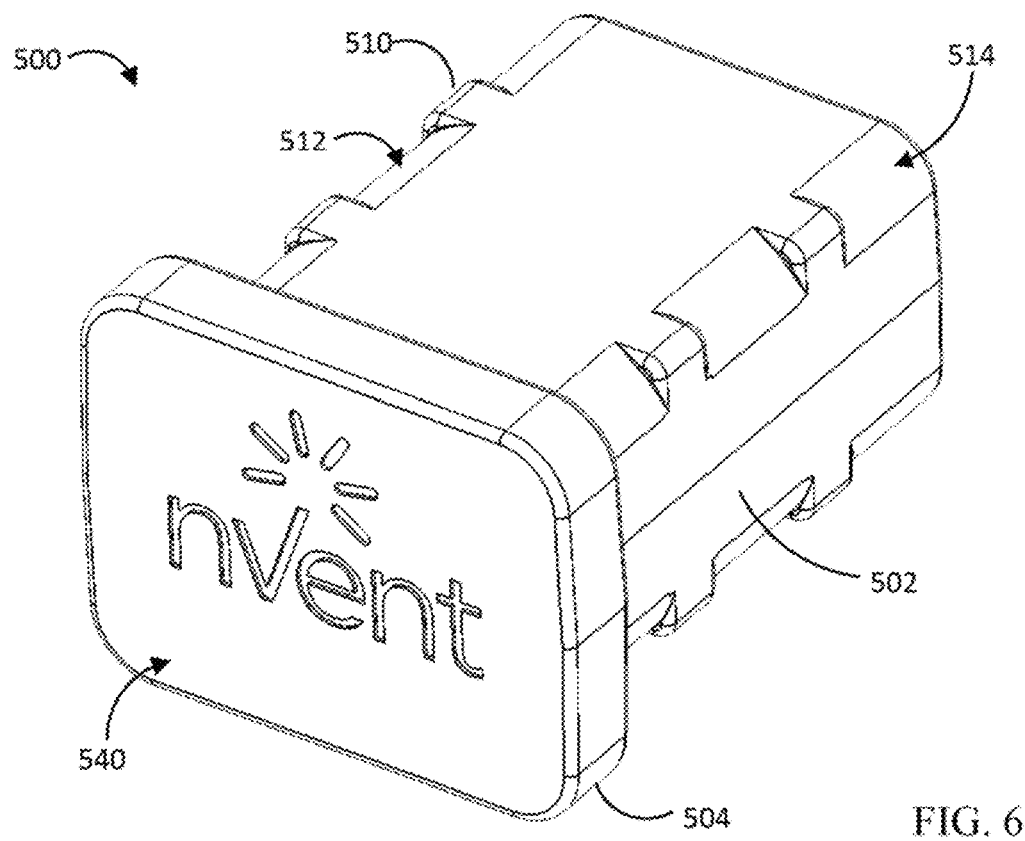
FIG. 6 is a top front perspective view of the end cap of FIG. 5.
Figure 7:
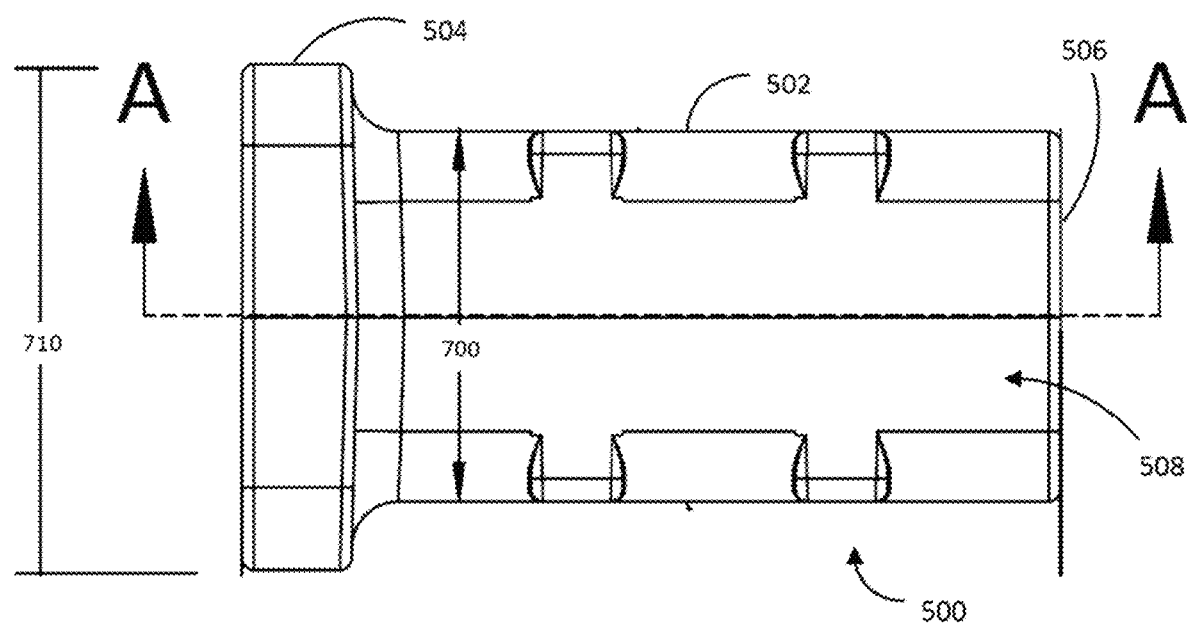
FIG. 7 is a side view of end cap of FIG. 5.
Figure 8:
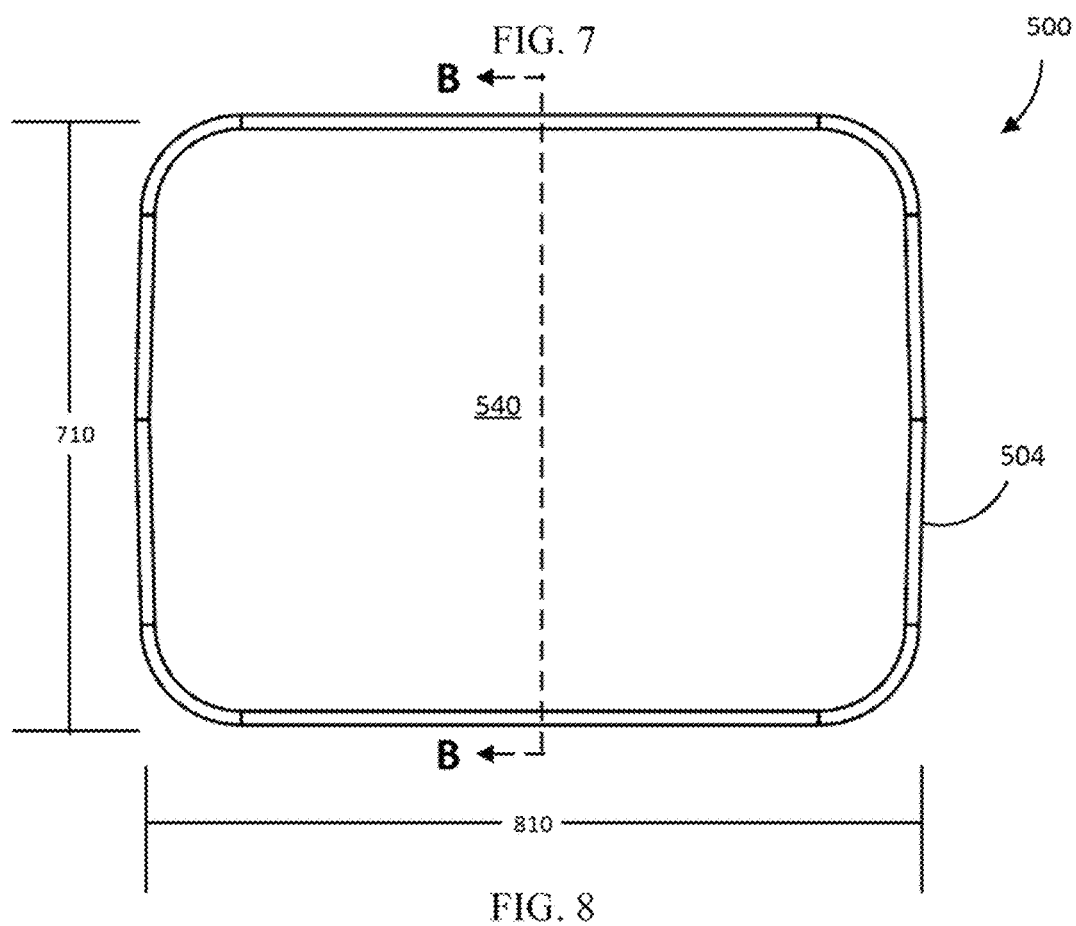
FIG. 8 is a front view of the end cap of FIG. 5.
Figure 9:
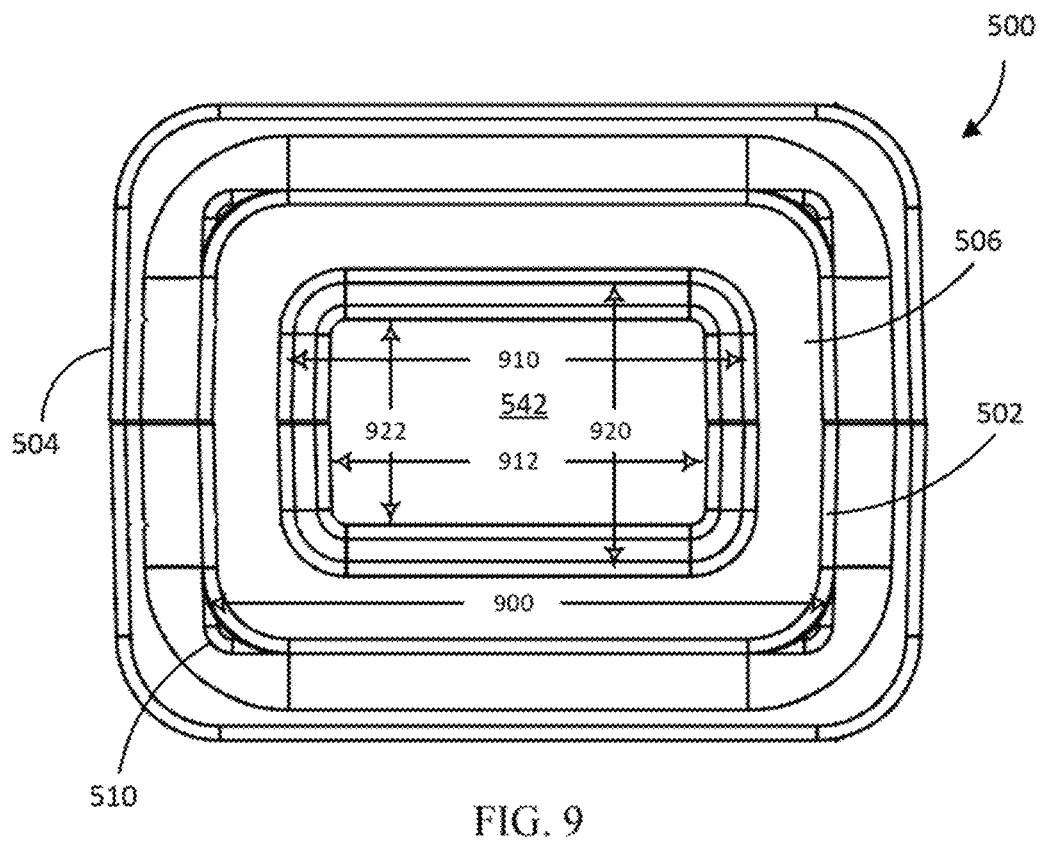
FIG. 9 is a rear view of the end cap of FIG. 5.
Figure 10:
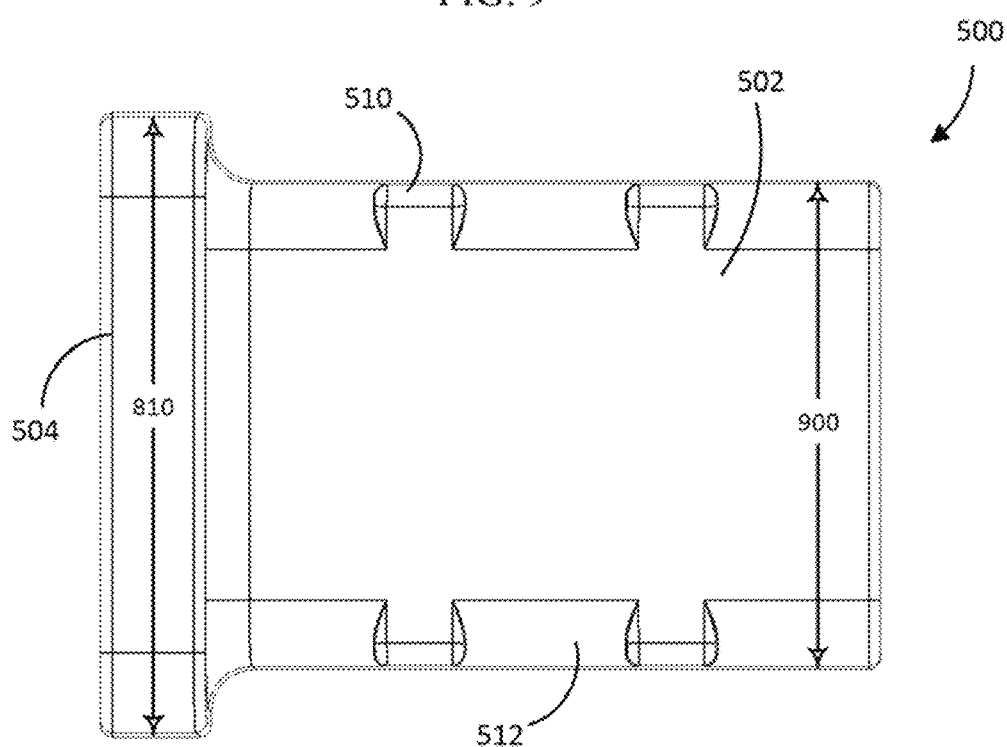
FIG. 10 is a top view of the end cap of FIG. 5.
Figure 11:
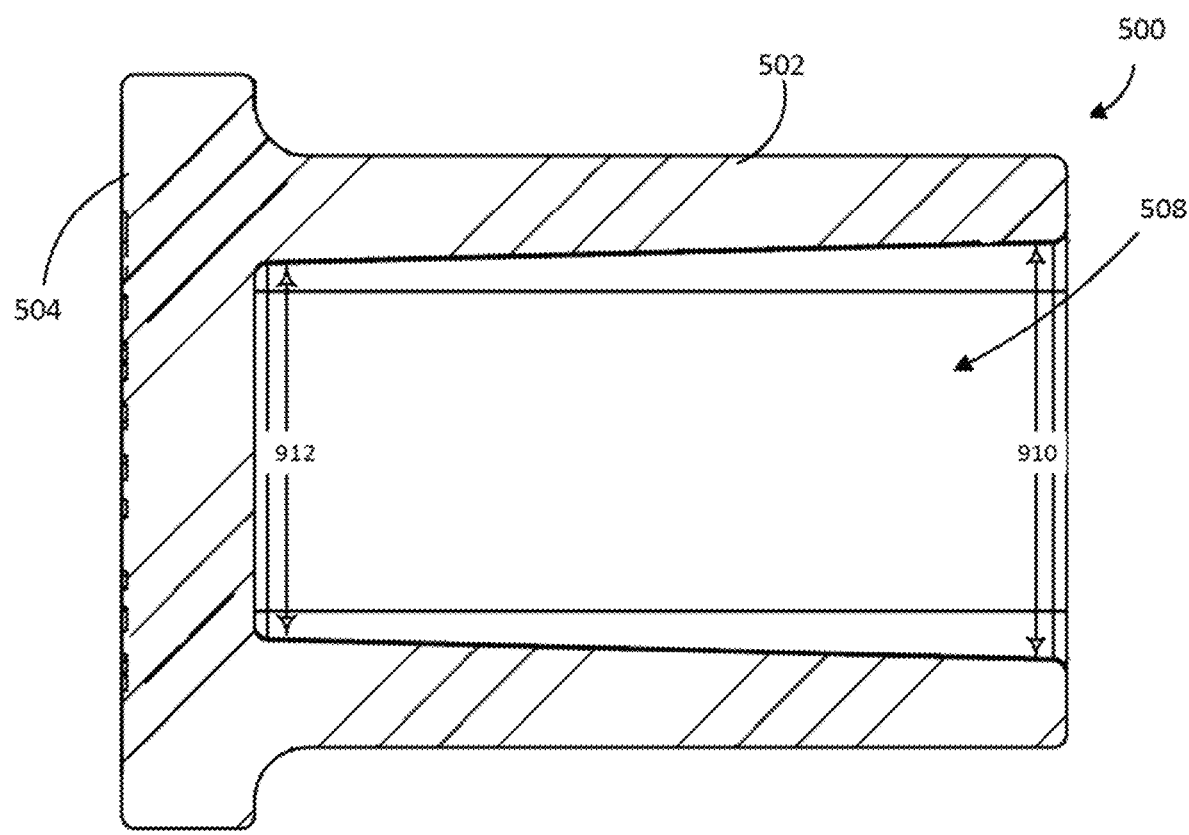
FIG. 11 is a cross-sectional bottom view of the end cap of FIG. 5 taken along line A-A of FIG. 7.
Figure 12:
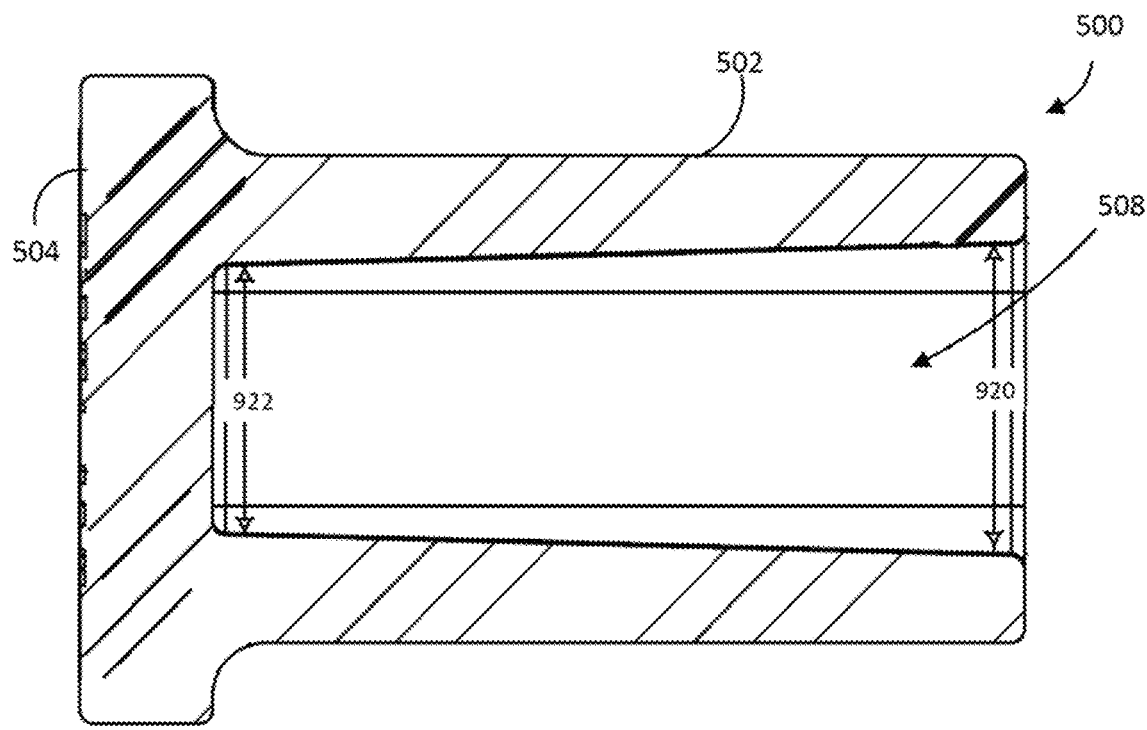
FIG. 12 is a cross-sectional side view of the end cap of FIG. 5 taken along line B-B of FIG. 8.

The synergy between a flame-retardant end cap and an appropriate heat shrink tubing provides a configuration to improve a flammability performance of end seal heat shrink kits. The end cap protects the integral component of a kit once a flame is applied at the bottom portion of heat shrink kit. Furthermore, a heat shrink tubing with appropriate dimension (i.e. recovered inside diameter) can prevent the heat shrink tubing from splitting during the flammability testing once a flame is provided anywhere along the heat shrink tubing. FIG. 4 illustrates the results of applying a vertical flame test to the heat shrink kit 304 and end cap 300 as installed in FIG. 3. The end cap 300 prevented excess damage to the heat shrink tubing 302, and allowed the heat shrink kit 304 to pass the vertical flame test.

In a vertical flame test, a 460 mm long sample of a trace heater (i.e. the cables 310) with any integral component (i.e. the heat shrink kit 304 and/or end cap 300) shall be supported in a vertical position. A gas burner is mounted on a 20° angle block. A test flame is 125±10 mm long with an inner blue cone 40±2 mm high. A tip of an inner blue cone of the flame impinges on the outer surface of the sample (it can be anywhere on the sample). A strip of gummed kraft paper 12.5±1 mm wide is attached 254 mm above the flame application point. This paper strip is to extend out 20 mm from the opposite side where the flame is applied. The distance of lower clamp to point of flame application shall be at least 50 mm. Likewise, the distance of upper clamp to paper indicator shall be at least 50 mm. Underneath the test setup may or may not be a cotton layer depending on the standard of testing. The test shall be conducted where all drafts of air are excluded. The flame is applied for 15 seconds then removed for 15 seconds for a total of five times. The flame-retardant properties of the trace heater or surface heater shall be such that the exterior surface will neither support combustion for more than 60 s after five 15 s applications of a standard test flame (the period between applications of the flame being 15 s) nor convey flame either during or after the five applications of the test flame, and no cotton of the optional underlaying cotton layer igniting. A test sample shall be considered to have conveyed flame if more than 25% of the extended portion of the indicator is burned.

In the vertical flame test conducted with the heat shrink kit 304 and end cap 300, the results of which are shown in FIG. 4, the flame was applied directly at the end cap 300 in order to test the effectiveness of the end cap 300. The sample including the end cap 300, heat shrink kit 304, and cables 310 were determined to pass the vertical flame test according to the above criteria.

FIGS. 5-12 illustrate another embodiment of an end cap 500 for the present splice kit, which is prismatic instead of cylindrical. With equivalent composition, length, and wall thicknesses, the prismatic end cap 500 has demonstrated superior impact stresses to the cylindrical end cap 400 mostly at cold impact testing. The end cap 500 can be made from a flame retardant material such as unfilled or glass filled polyphenylene sulfide (PPS) or polyetherimide (PEI) as described above. The end cap 500 may have a tubing portion 502 attached to or integral with an end portion 504. An outer surface of the tubing portion 502 may define a series of projections 510 and/or grooves 512; that is, in some embodiments, grooves 512 may be formed into the outer surface, creating projections 410 therebetween, or projections 410 may be attached to or integral with the tubing portion 502 and project away from the outer surface. The projections 510 and/or grooves 512, or a combination thereof, provide a friction fit with the heat shrink tubing, in the manner described above with respect to the ribs 410 of the end cap 400 of FIGS. 2A-B. Thus, projections 510 or grooves 512 can in some embodiments extend entirely or substantially around the perimeter of the outer surface; in other embodiments, as depicted, the projections 510 can be "teeth" formed along one, some, or all of the edges between the top, sides, and bottom of the tubing portion 502. When the heat shrink tubing is shrunk, the projections 510 and grooves 512 allow the heat shrink tubing to be better coupled to the end cap 500, preventing the end cap 500 from being moved out of place when the spliced cable(s) is/are installed or reinstalled. Additionally, the projections 510 and grooves 512 may allow a heat shrink tubing without an adhesive lining to be used in the heat shrink kit by providing a friction fit with the heat shrink tubing and thus retaining the heat shrink tubing.

An end 506 of the tubing portion 502 opposite the end portion 504 defines an aperture to the interior space 508 of the end cap 500. In some embodiments, the interior space 508 can have a shape and volume defined by an inner surface 520 of the tubing portion 502 and a rear surface 542 of the end portion 504. The tubing portion 502 may be inserted into a heat shrink tubing, and/or may be disposed over a wire splice or cable termination and then the heat shrink tubing pulled over the end cap 500, such that at least a portion of the tubing portion 502 is in contact with an inner surface of the heat shrink tubing and the spliced or terminated conductors are inside the interior space 508. The end portion 504, having a front surface 540 facing outward from the cable(s), may prevent a flame applied during a flammability test from reaching an adhesive of the heat shrink tubing and thereby provide flammability protection for the heat shrink tubing, as well as all other components of the cables that would be exposed at the splice.

Figure 15:
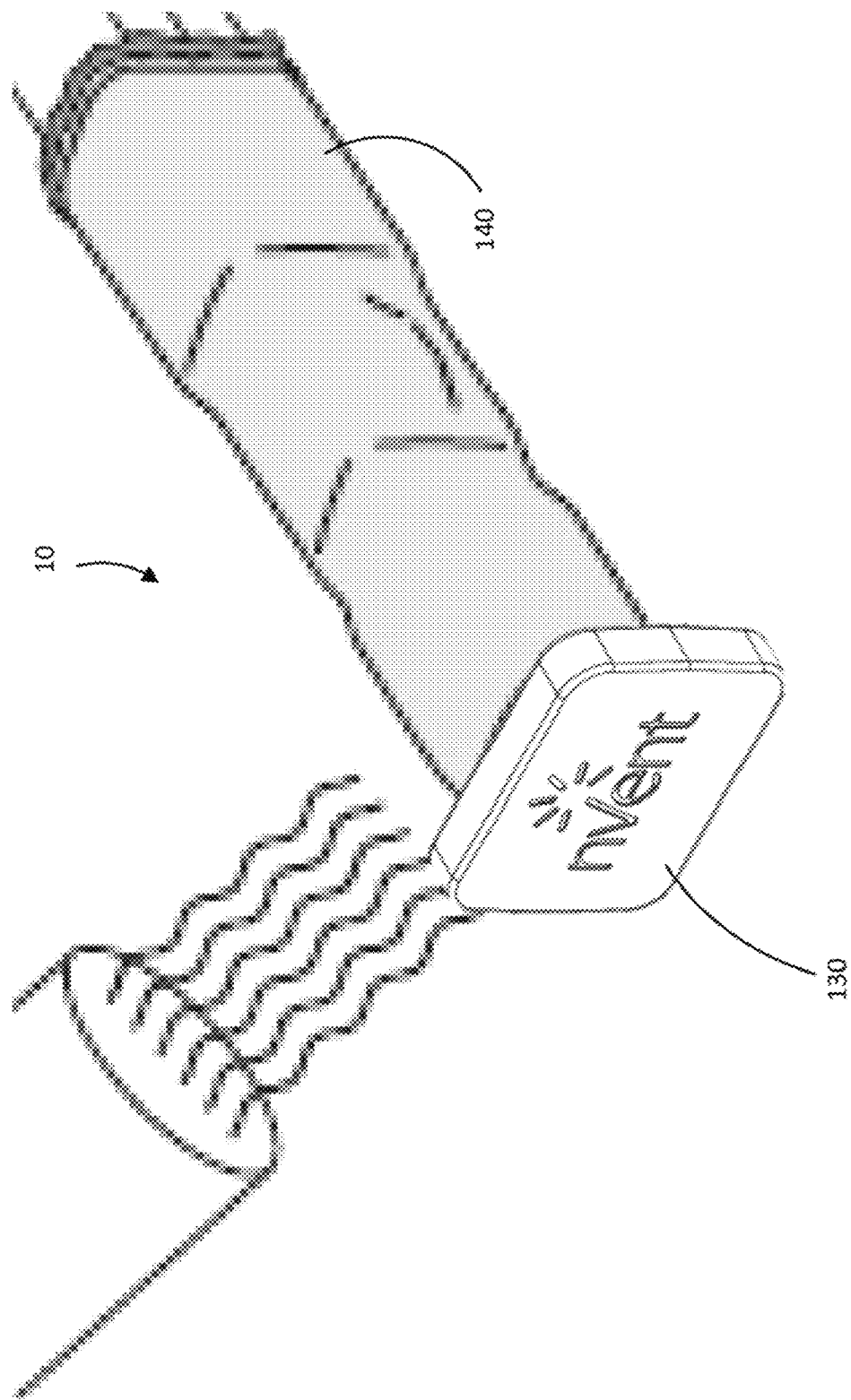

Referring to FIGS. 7-10, the tubing portion 502 can be sized to fit inside heat shrink tubing (i.e., as shown in FIGS. 3 and 15). Specifically, the tubing portion 502 can be sized along a minor width 700 (FIG. 7) and a major width 900 (FIG. 9) to allow tubing portion 502 to fit inside the heat shrink tubing before shrinking. Further, the interior space 508 can be sized to allow one or more components of a cable and/or heat shrink kit to fit inside the tubing portion 502. The interior space 508 can have a uniform width along its length, or the interior space 508 can taper along the interior surface 520 of any or all of the top, bottom, left side, and right side of the tubing portion 502. For example, as shown in the rear view of FIG. 9 and the cross-sections of FIGS. 11 and 12, both the major width and the minor width of the interior space 508 can taper from maximum widths 910, 920 at or approximate (i.e., when a lip of the aperture is rounded as illustrated) the end 506 of the tubing portion 502, to minimum widths 912, 914 at or approximate the rear surface 542 of the end portion 504.

The end portion 504 may have a minor width 710 and a major width 810 that are both larger than the corresponding outer widths of the tubing portion 502. Furthermore, the widths 710, 810 may be larger than the diameter of the heat shrink tubing after the heat shrink tubing is stretched and/or shrunk over the tubing portion. In this arrangement, the end cap 500 can prevent at least a portion of a flame applied during a vertical flame test from reaching an adhesive or an inner surface of the heat shrink tubing, prevent at least a portion of the adhesive from igniting, and allow the heat shrink kit to pass the flammability test.

Figure 13:
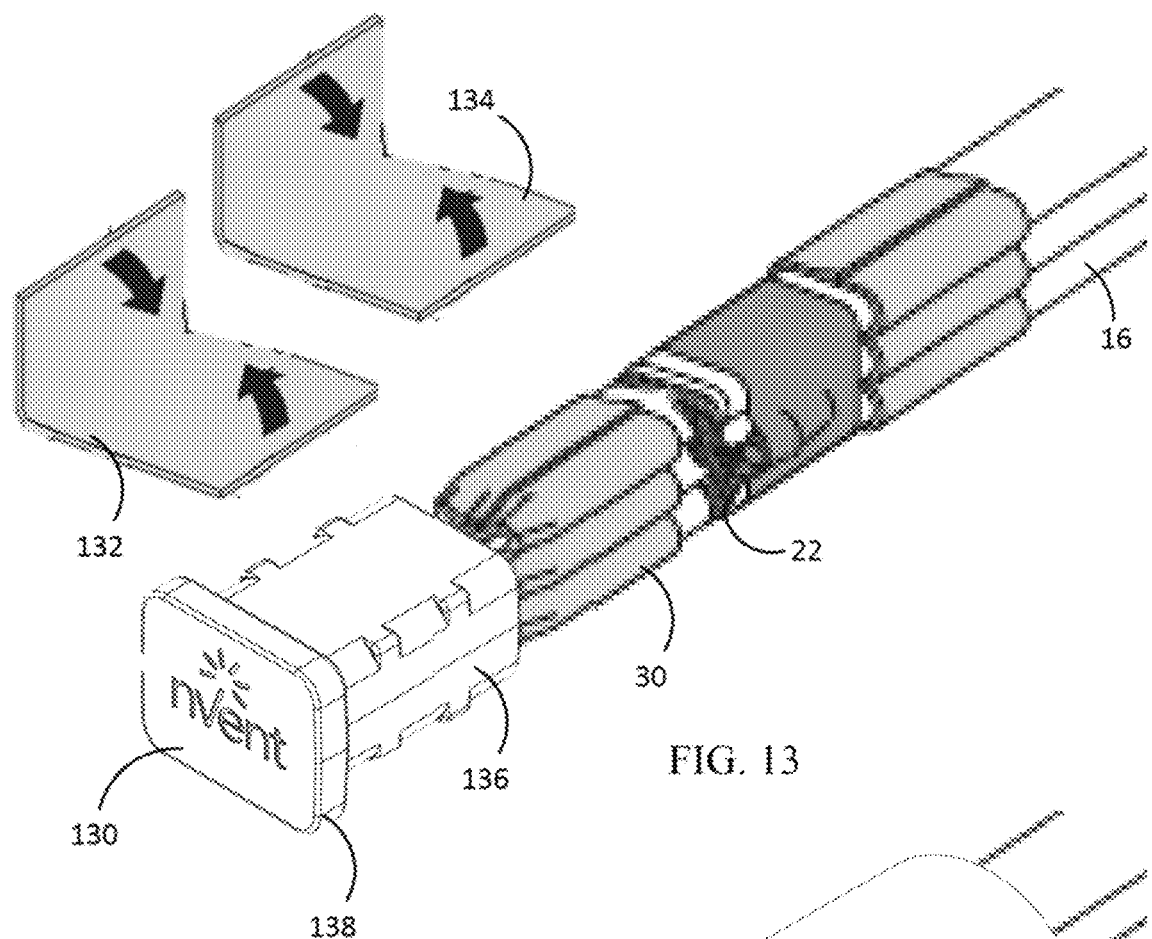
FIGS. 13-15 illustrate a perspective view of several more steps of creating the tee connection splice of three heating cables, using the example splice kit in accordance with the disclosure.
Figure 14:
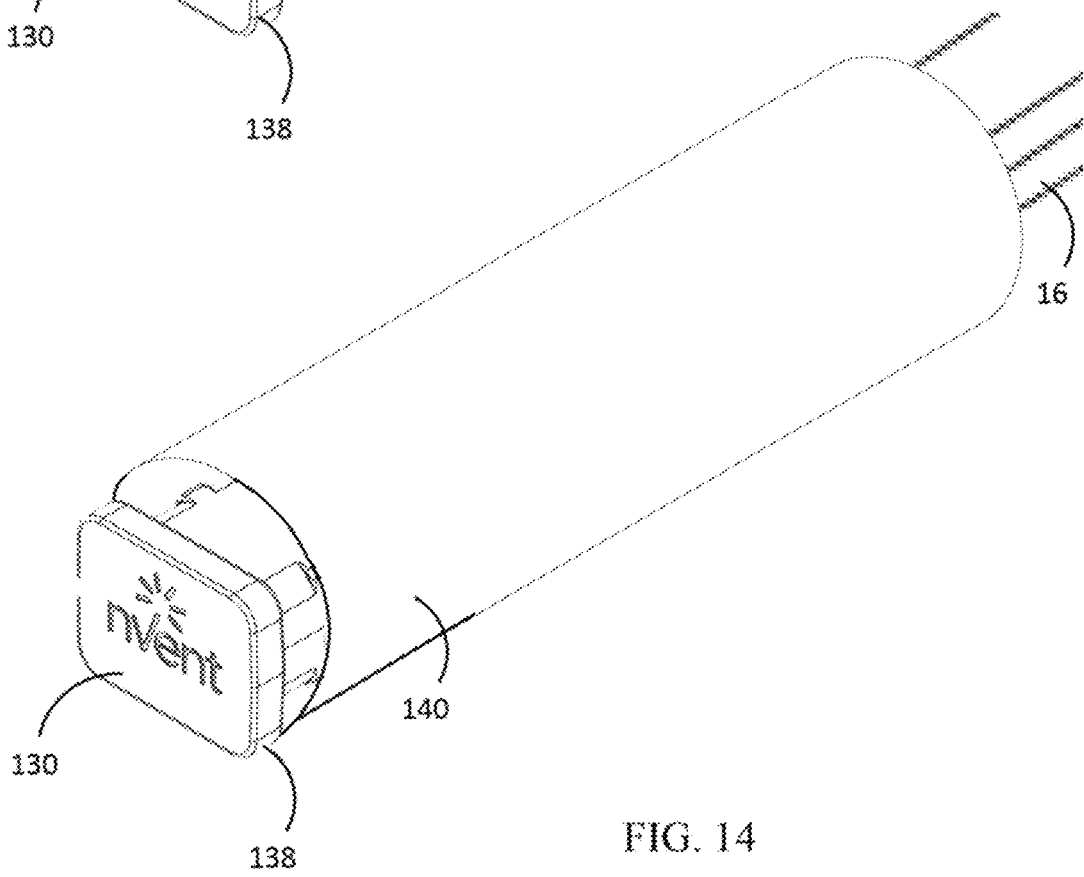

FIGS. 13-15 show the steps of installing the heat shrink assembly of the present splice kit on the tee connection splice of three cables 16, prepared as described and illustrated in FIGS. 1A-D. Referring to FIG. 13, an end cap 130, which can be the end cap 400, or the end cap 500 as illustrated, or another end cap in accordance with this disclosure, is fitted over the spliced conductors (i.e., by inserting the mechanical connectors 12 into the interior space 508). Optionally, one or more adhesive layers 132, 134 can then be applied. For example, a proximal mastic layer 132 can be wrapped over the interface between the end cap 130 and the cables 16 (i.e., over the pinched ends of the mastic layers 30 and over the distal end of the tubing portion 136, sealing the interface against liquid, fire, and smoke ingress. A distal mastic layer 134 can also be applied, over any part of the cables 16 that have been modified for the splice and remain exposed (e.g., the insulation 18 and drain layers 22 at the stripped end of the jacket 20).

Referring to FIGS. 14 and 15, a heat shrink tubing 140 is then pulled over the splice, either from the distal (unspliced) ends of the cables 16, or over an end portion 138 of the end cap 130; once the tubing 140 is in place, heat is applied to the heat shrink tubing 140 to shrink the heat shrink tubing 140 against the cables 16 and the other components of the splice kit, completing the splice. In accordance with some embodiments, the heat shrink tubing should be chosen based on an appropriate minimum expanded inside diameter and a maximum recovered (i.e. shrunk) inside diameter after a shrinking process. An appropriate heat shrink tubing can be chosen by selecting a heat shrink tubing which fits a kit dimension (i.e. fits around and/or over a heat shrink kit) before a shrinking process and nearly fully recovers after the shrinking process. If a heat shrink tubing does not nearly fully recover, it may shrink further and potentially split during the flammability testing. To reduce likelihood of splitting during the test, the maximum recovered inside diameter of the heat shrink tubing can be selected to be approximately equal to or slightly smaller than the outer diameter or equivalent outer diameter (i.e perimeter divided by pi). For example, a heat shrink tubing with a high shrink ratio and a recovered inner diameter significantly smaller than the perimeter of the tubing portion 132 may burst during flammability testing as the heat shrink tubing may further contract around the end cap 130 and potentially rupture.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

The invention claimed is:

1. A splice kit for providing environmental protection to a splice of electric heating cables, the splice kit comprising:
    a length of heat shrink tubing having a pre-shrunk inner diameter and a shrunk inner diameter; and
    an end cap made of a flame-resistant material, the end cap comprising:
        a tubing portion having an inner surface, an outer surface, and one or more projections extending outward from the outer surface, the tubing portion sized to fit within the pre-shrunk inner diameter and to be larger than the shrunk inner diameter, the tubing portion being shorter than the length of heat shrink tubing;
        an end portion integral with the tubing portion and wider than the tubing portion, the end portion configured to prevent at least a portion of a flame from reaching the heat shrink tubing; and
        an interior space defined by the inner surface of the tubing portion, the interior space being configured to receive conductors of the heating cables that are connected together at the splice.

2. The splice kit of claim 1, wherein the end cap is cylindrical.

3. The splice kit of claim 2, wherein the one or more projections include a first rib extending entirely around a circumference of the outer surface.

4. The splice kit of claim 2, wherein the tubing portion has an outer diameter measured at the outer surface, and the end portion has an outer diameter that is greater than the outer diameter of the tubing portion.

5. The splice kit of claim 1, wherein the tubing portion and the end portion are prismatic.

6. The splice kit of claim 5, wherein the tubing portion comprises grooves formed into the outer surface to define the one or more projections.

7. The splice kit of claim 6, wherein the projections are formed at each of a plurality of corners of the tubing portion.

8. The splice kit of claim 5, wherein the end portion comprises a front surface and a rear surface opposite the front surface, the rear surface cooperating with the inner surface of the tubing portion to define the interior space.

9. The splice kit of claim 1, wherein the interior space of the end cap has a tapering width.

10. The splice kit of claim 9, wherein the tapering width comprises a maximum width at a distal end of the tubing portion opposite the end portion, and a minimum width approximate the end portion.

11. The splice kit of claim 1, wherein the heat shrink tubing is selected relative to a size of the end cap to allow the splice protected by the splice kit to pass a vertical flame flammability test.

12. The splice kit of claim 1, further comprising a first mastic layer configured to be applied over an interface between the end cap and the heating cables before the heat shrink tubing is placed over the splice and then shrunk.

13. An end cap for a heat shrink kit having a heat shrink tubing, the end cap comprising:
   a tubing portion including outwardly extending projections, the tubing portion sized to be inserted into the heat shrink tubing so that the heat shrink tubing extends past an aperture end of the tubing portion, the aperture end including an aperture open to an interior space; and
   an end portion opposite the aperture end and sized larger than a shrunk diameter of the heat shrink tubing, the end portion configured to prevent at least a portion of a flame from reaching the heat shrink tubing.

14. The end cap of claim 13, wherein the heat shrink kit is a tee connection kit.

15. The end cap of claim 13, wherein the heat shrink kit is an end seal kit.

16. The end cap of claim 13, wherein the heat shrink kit is a splice kit.

17. The end cap of claim 13, wherein the tubing portion and the end portion are cylindrical.

18. The end cap of claim 13, wherein the tubing portion and the end portion are prismatic.

19. The end cap of claim 18, wherein the tubing portion comprises an outer surface having a plurality of grooves that define the projections.

* * * * *